(12) United States Patent
Tsai et al.

(10) Patent No.: US 7,888,877 B2
(45) Date of Patent: Feb. 15, 2011

(54) LIGHT EMITTING DIODE LAMP AND ILLUMINATION SYSTEM

(75) Inventors: Wen-Kuei Tsai, Taipei County (TW); Chun-Chien Wang, Taipei County (TW)

(73) Assignee: Top Energy Saving System Corp., Taipei County (TW)

( * ) Notice: Subject to any disclaimer, the term of this patent is extended or adjusted under 35 U.S.C. 154(b) by 488 days.

(21) Appl. No.: 11/839,510

(22) Filed: Aug. 15, 2007

(65) Prior Publication Data
US 2009/0033245 A1    Feb. 5, 2009

(30) Foreign Application Priority Data
Jul. 30, 2007  (TW) .............. 96127738 A

(51) Int. Cl.
    *H05B 37/02* (2006.01)
(52) U.S. Cl. .............. 315/158; 315/185 S; 315/247; 315/312; 315/291
(58) Field of Classification Search .............. 315/185 S, 315/247, 291, 307, 312–326, 200 A
See application file for complete search history.

(56) References Cited

U.S. PATENT DOCUMENTS

| | | | | |
|---|---|---|---|---|
| 3,873,882 | A * | 3/1975 | Gershen ............... | 315/92 |
| 3,898,516 | A * | 8/1975 | Nakasone ............. | 315/194 |
| 4,894,524 | A * | 1/1990 | Murase et al. ......... | 250/205 |
| 7,012,384 | B2 * | 3/2006 | Tatewaki et al. ....... | 315/323 |
| 7,026,799 | B2 * | 4/2006 | Popplow et al. ....... | 323/229 |
| 7,239,231 | B2 * | 7/2007 | Tsukamoto ............ | 340/438 |
| 7,755,595 | B2 * | 7/2010 | Ferguson ............... | 345/102 |
| 2003/0048632 | A1 | 3/2003 | Archer | |
| 2007/0075649 | A1 * | 4/2007 | Yamashita et al. ..... | 315/159 |
| 2008/0111500 | A1 * | 5/2008 | Hoover ................. | 315/293 |

FOREIGN PATENT DOCUMENTS

| | | |
|---|---|---|
| CN | 2575422 | 9/2003 |
| CN | 2684517 | 3/2005 |
| CN | 2692954 | 4/2005 |
| CN | 1645876 | 7/2005 |
| DE | 29904988 U1 | 3/1999 |
| DE | 10201131 A1 | 1/2001 |
| DE | 102005018175 A1 | 10/2006 |
| JP | 11-191496 | 7/1999 |
| JP | 2003-151306 | 5/2003 |

OTHER PUBLICATIONS

"1st Office Action of counterpart China application", issued on Aug. 23, 2009, p. 1-p. 7.

* cited by examiner

*Primary Examiner*—Tuyet Thi Vo
(74) *Attorney, Agent, or Firm*—Stout, Uxa, Buyan & Mullins, LLP

(57) ABSTRACT

A light emitting diode (LED) lamp electrically connected to a switch is provided. The LED lamp includes a lamp body, an LED array disposed inside the lamp body, and a current control circuit disposed inside the lamp body. The current control circuit is electrically connected between the LED array and the switch. The current control circuit is capable of outputting various driving currents to the LED array according to the number of flashing times of the switch, so as to modulate the intensity of light emitted from the LED array. Since the above-mentioned LED lamp has the built-in current control circuit, users are capable of modulating the intensity of light emitted from the above-mentioned LED lamp by flashing the switch.

18 Claims, 7 Drawing Sheets

LIGHT EMITTING DIODE LAMP AND ILLUMINATION SYSTEM

CROSS-REFERENCE TO RELATED APPLICATION

This application claims the priority benefit of Taiwan application serial no. 96127738, filed Jul. 30, 2007. All disclosure of the Taiwan application is incorporated herein by reference.

BACKGROUND OF THE INVENTION

1. Field of the Invention

The present invention relates to a lamp and an illumination system. More particularly, the present invention relates to a light emitting diode (LED) lamp and an illumination system using the LED light source.

2. Description of Related Art

LEDs are semiconductor devices. The light emitting chips are mainly made of a compound semiconductor material containing III-V group chemical elements, for example, GaP, GaAs, and the like, and function on the principle of converting electric energy to light. That is to say, the compound semiconductor is powered to release excessive energy through the combination of electrons and holes, so as to emit photon (light). The LED can emit light without being heated or does not discharge to emit light. Therefore, the lifespan of the LED is up to 100,000 hours, and an idling time is not required. In addition, the LED has advantages of quick response speed (approximately $10^{-9}$ seconds), small volume, power-saving, low pollution, high reliability, and ease mass production. Thus, the LEDs have been intensively used in many fields, for example, light source and illumination device in large-scale bulletin boards, traffic lights, cellular phones, scanners, fax machines, etc.

The light emitting brightness and efficiency of the LEDs are continuously improved, and meanwhile the white LEDs are successfully put into mass production, so the LED have been gradually used for illumination purpose, and LED bulbs have been developed. However, mostly the LED bulbs may provide constant brightness. If the brightness is required to be adjusted, usually a current control circuit capable of modulating current is installed in a power distribution system so as to control the LED bulbs to vary in brightness. However, if the power distribution system in the environment of the user does not have the current control circuit capable of modulating current, the LED bulbs cannot change brightness according to requirements of the user. In other words, currently, the application of the LED bulbs is limited.

SUMMARY OF THE INVENTION

Accordingly, the present invention is directed to provide an LED lamp, for providing a plurality of lights with different intensities.

The present invention further provides an illumination system, for providing a plurality of lights with different intensities.

The present invention also provides an illumination system, which delays a time point at which the light source is completely turned off after a power source is shut down.

The present invention provides an LED lamp, electrically connected to a switch. The LED lamp includes a lamp body, an LED array disposed inside the lamp body, and a current control circuit disposed inside the lamp body. The current control circuit is electrically connected between the LED array and the switch, and the current control circuit outputs various driving currents to the LED array according to a number of flashing times of the switch, so as to modulate an intensity of light emitted from the LED array.

In an embodiment of the present invention, the lamp body includes an electrode portion and a lampshade connected to the electrode portion. The LED array is disposed inside the lampshade, and the LED array and the current control circuit are electrically connected to the switch through the electrode portion.

In an embodiment of the present invention, the LED array includes a carrier and a plurality of LEDs disposed on the carrier.

In an embodiment of the present invention, the carrier includes a metal core printed circuit board (MCPCB).

In an embodiment of the present invention, the LEDs include surface mount device (SMD) type packages or pin through hole (PTH) type packages.

In an embodiment of the present invention, the driving current output from the current control circuit to the LED array increases with the increase of the number of flashing times of the switch.

In an embodiment of the present invention, the driving current output from the current control circuit to the LED array decreases with the increase of the number of flashing times of the switch.

In an embodiment of the present invention, the current control circuit is built in the LED array.

In an embodiment of the present invention, the LED lamp further includes a temperature sensor. The temperature sensor is disposed inside the lamp body and electrically connected to the current control circuit, and the current control circuit modulates the driving current provided to the LED array according a feedback signal provided by the temperature sensor.

The present invention further provides an illumination system, which includes a switch, an LED light source, and a current control circuit. The current control circuit is electrically connected between the switch and the LED light source. When the switch is turned on, the current control circuit outputs a driving current to make the brightness of the LED light source change from a first brightness to a second brightness. During the change of the brightness of the LED light source from the first brightness to the second brightness, the switch is flashed to stop the change of the brightness, so that the brightness of the LED light source is maintained at a third brightness between the first brightness and the second brightness.

In an embodiment of the present invention, the switch includes a tactile switch or a button switch.

In an embodiment of the present invention, the LED light source includes an LED lamp.

In an embodiment of the present invention, the current control circuit is built in the switch.

In an embodiment of the present invention, the current control circuit is built in the LED light source.

In an embodiment of the present invention, the first brightness is greater than the second brightness.

In an embodiment of the present invention, the first brightness is lower than the second brightness.

In an embodiment of the present invention, during the change of the brightness of the LED light source from the first brightness to the second brightness, the brightness of the LED light source changes continuously.

In an embodiment of the present invention, during the change of the brightness of the LED light source from the first brightness to the second brightness, the brightness of the LED light source changes non-continuously.

In an embodiment of the present invention, in the illumination system, the LED light source further includes a temperature sensor electrically connected to the current control circuit, and the current control circuit modulates the driving current provided to the LED light source according to a feedback signal provided by the temperature sensor.

The present invention provides an illumination system, which includes a switch, an LED light source, and a current control circuit. The current control circuit is electrically connected between the switch and the LED light source. When the switch is turned off, the current control circuit outputs a driving current to delay a time point at which the LED light source is completely turned off.

The LED lamp of the present invention has the built-in current control circuit, so the user may flash the switch to switch the brightness of the LED lamp without changing the power distribution system of the environment. In addition, after the user turns on the illumination system of the present invention, the brightness of the illumination system will change with time. The user may flash the switch when the illumination system shows a specific brightness, so that the LED light source shows the specific brightness continuously. Further, the illumination system of the present invention may delay the time point at which the lamp is completely turned off after the power source is switched off, which provides convenience for the user to do something in this period. Therefore, the illumination system of the present invention has advantages of convenient operation and intelligent brightness adjustment.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The First Embodiment

Figure 1:
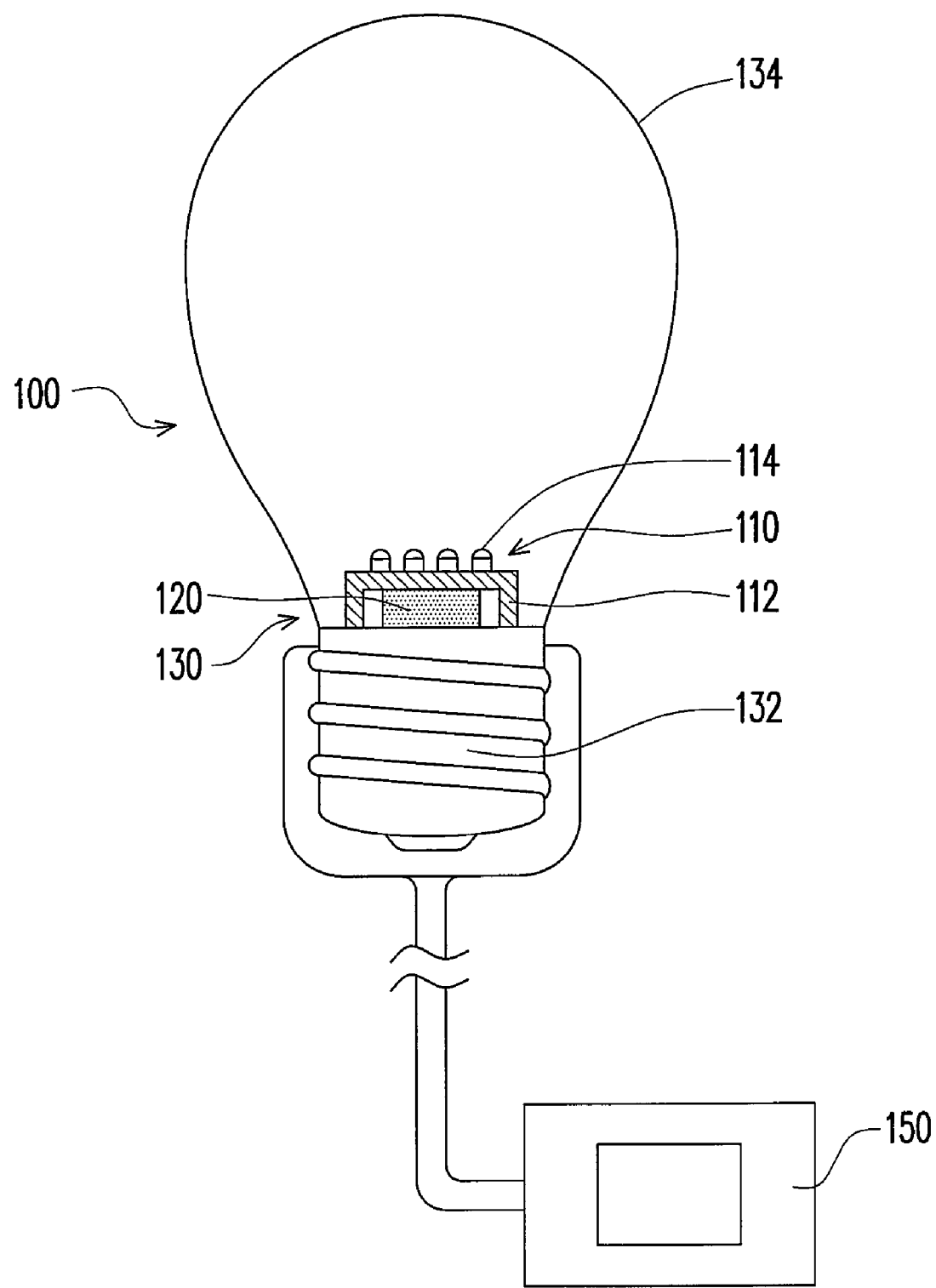
FIG. 1 is a schematic view of an LED lamp according to a first embodiment of the present invention.

FIG. 1 is a schematic view of an LED lamp according to a first embodiment of the present invention. Referring to FIG. 1, the LED lamp 100 of this embodiment is electrically connected to a switch 150. The LED lamp 100 includes a lamp body 130, an LED array 110 disposed inside the lamp body 130, and a current control circuit 120 disposed inside the lamp body 130. The current control circuit 120 is electrically connected between the LED array 110 and the switch 150, and the current control circuit 120 outputs a plurality of driving currents to the LED array 110 according to a number of flashing times of the switch 150, so as to modulate an intensity of light emitted from the LED array 110. Here, "flashing" generally refers to a switching action of the switch 150 used to modulate the intensity of light emitted from the LED array 110. In this embodiment, the switch 150 electrically connected to the LED lamp 110 is, for example, a button switch or a tactile switch. As for the button switch, "flashing" may be defined as an action that the button switch is quickly turned on after being turned off. Here, the time for the button switch to quickly turn on after being turned off may be set according to different requirements, and the time required by flashing is not limited in the present invention. If the LED lamp 100 of this embodiment is electrically connected to the tactile switch, "flashing" may be defined as an action that the tactile switch is touched once. Definitely, the present invention can also adopt other types of switches 150 to control the intensity of light emitted from the LED array 110 in the LED lamp 100.

The LED lamp 100 of this embodiment may be different types of lamps, for example, light bulbs, spot lights, etc. The lamp body 130 of the LED bulb includes an electrode portion 132 and a lampshade 134 connected to the electrode portion 132. The LED array 110 is disposed inside the lampshade, and the LED array 110 and the current control circuit 120 are electrically connected to the switch 150 through the electrode portion 132. Generally speaking, mostly the lampshade 134 is fabricated by frosted glass or plastic material that allows light to pass through partially, and may diffuse light uniformly, so as to provide the glareless soft light. In addition, the profile of the electrode portion 132 is required to match a bulb socket, so as to conduct power into the bulb for the LED array 110 to use.

In this embodiment, the LED array 110 includes a carrier 112 and a plurality of LEDs 114 disposed on the carrier 112, and the LED 114 may be SMD type packages or PTH type packages. The carrier 112 is, for example, a MCPCB or other carriers with good thermal conductivity.

In this embodiment, the driving current output from the current control circuit 120 to the LED array 110 increases with the increase of the number of flashing times of the switch 150. In detail, when the switch 150 is turned on, the current control circuit 120 may output a minimum driving current, so that the intensity of light emitted from the LED array 110 is the minimum. Then, the user may flash the switch 150 to gradually increase the driving current output from the current control circuit 120, so that the intensity of light emitted from the LED array 110 gradually increases until reaching the maximum value. Definitely, the driving current output from the current control circuit 120 to the LED array 110 may decrease with the increase of the number of flashing times of the switch 150. In detail, when the switch 150 is turned on, the current control circuit 120 may output a maximum driving current, so that the intensity of light emitted from the LED array 110 is the maximum. Then, the user may use flash the switch 150 to gradually reduce the driving current output from the current control circuit 120, so that the intensity of light emitted from the LED array 110 gradually decreases until reaching the minimum value.

In this embodiment, the current control circuit 120 may be built in the LED array 110. For example, if the current control circuit 120 is integrated on the LED array 110, the current control circuit 120 may be fabricated into an integrated circuit (IC). The IC having the current modulation function is bonded on the carrier 112, so as to make the current control circuit 120 electrically connect to the carrier 112, thereby modulating driving current received by the LEDs 114.

The LED lamp of this embodiment may further include a temperature sensor. The temperature sensor is disposed inside the lamp body and is electrically connected to the current control circuit. The current control circuit may modulate the driving current provided to the LED array according to the feedback signal provided by the temperature sensor. Therefore, when the temperature sensor senses that the temperature is too high, the current control circuit may reduce the driving current output to the LED array, so as to lower the temperature to prolong the service life of the LED.

The Second Embodiment

Figure 2:
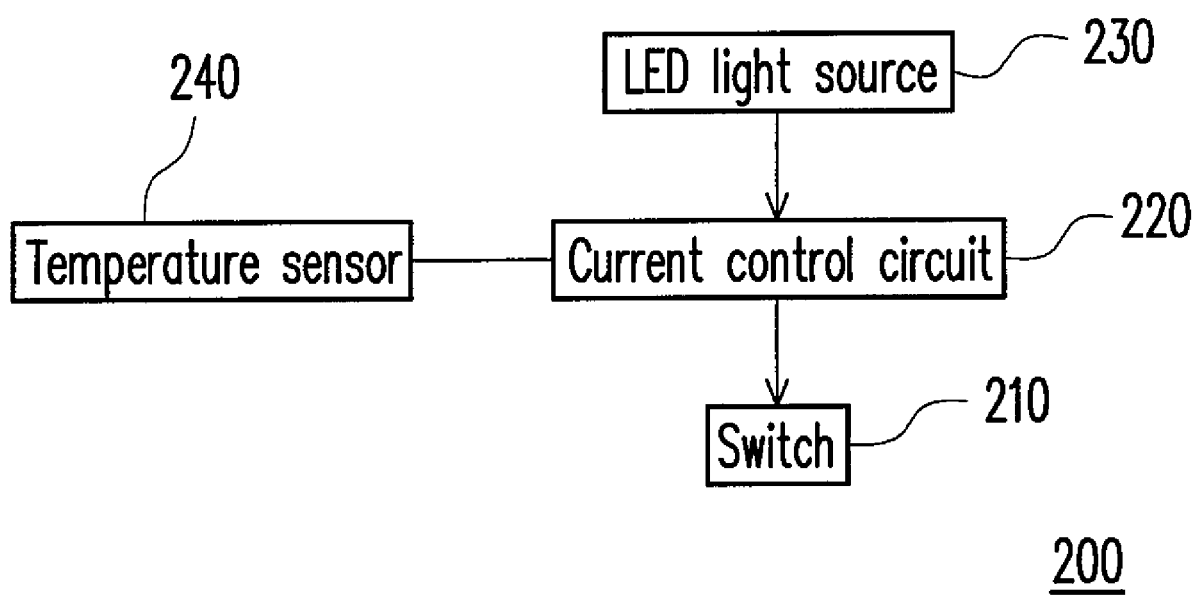
FIG. 2 is a schematic view of an illumination system according to a second embodiment of the present invention.

FIG. 2 is a schematic view of an illumination system according to a second embodiment of the present invention. Referring to FIG. 2, the illumination system 200 of this embodiment includes a switch 210, an LED light source 230, and a current control circuit 220. The current control circuit 220 is electrically connected between the switch 210 and the LED light source 230. When the switch 210 is turned on, the current control circuit 220 outputs a driving current to make the brightness of the LED light source 230 change from a first brightness L1 to a second brightness L2. During the change of the brightness of the LED light source 230 from the first brightness to the second brightness, the switch 210 is flashed to stop the change of the brightness, so that the brightness of the LED light source 230 is maintained at a third brightness between the first brightness and the second brightness. In this embodiment, the switch 210 electrically connected to the LED lamp 100 is, for example, the button switch or the tactile switch, and the definitions of flashing are described in the first embodiment, and will not be repeated herein again. In addition, the LED light source 230 of this embodiment is, for example, an LED bulb or another illumination device.

Figure 3A:
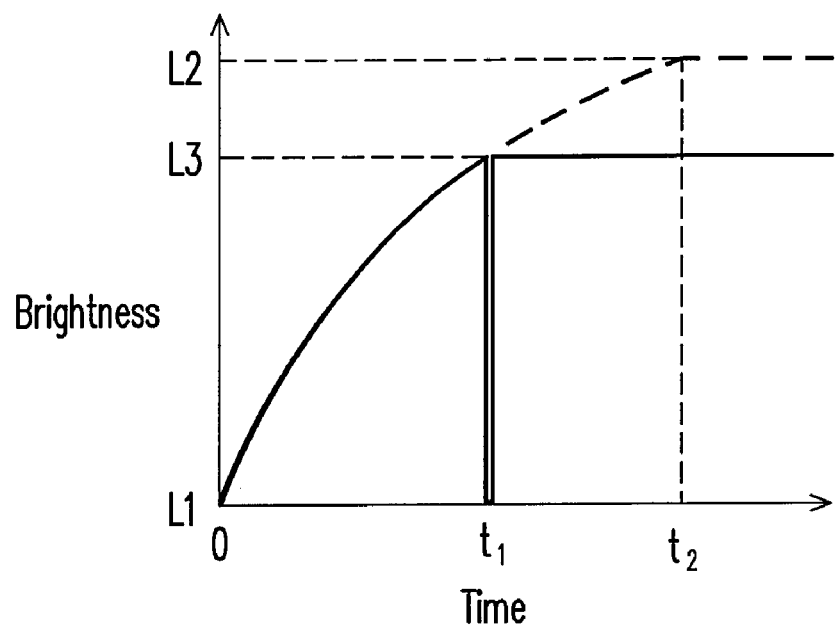
FIGS. 3A to 3D are diagrams showing the relationship between brightness and time of the illumination system according to the second embodiment of the present invention.

FIGS. 3A to 3D are diagrams showing a relationship between brightness and time of the illumination system according to the second embodiment of the present invention. Firstly, referring to FIGS. 2 and 3A, in this embodiment, during the change of the brightness of the LED light source 230 from a first brightness L1 to a second brightness L2, the brightness of the LED light source 230 may change continuously, and the brightness of the LED light source 230 may change linearly or non-linearly (as shown in FIG. 3A).

When the switch 210 is turned on by the user, the current control circuit 120 outputs a driving current that increases with time to the LED light source 230. If the user does not flash the switch 210 during a period of $0$-$t_2$, the brightness of the LED light source 230 increases from the first brightness L1 to the second brightness L2 continuously, so that the brightness is maintained at the second brightness L2. Otherwise, if the user flashes the switch 210 at a time $t_1$, the brightness of the LED light source 230 is instantly reduced to 0 during flashing, and then is maintained at the corresponding third brightness L3. No matter the brightness of the LED light source 230 is maintained at the second brightness L2 or at the third brightness L3, the user may turn off the switch 210 to turn off the LED light source 230. After the LED light source 230 is tuned off for a while (e.g. after several seconds), the user may select the brightness of the LED light source 230 according to the above mode again.

Figure 3B:
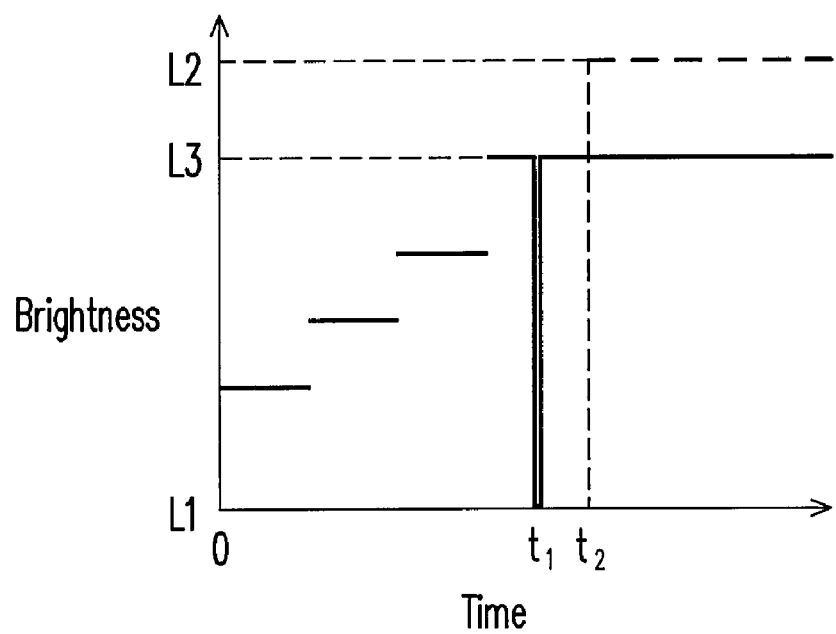

Firstly, referring to FIGS. 2 and 3B, in this embodiment, during the change of the brightness of the LED light source 230 from the first brightness L1 to a second brightness L2, the brightness of the LED light source 230 changes non-continuously.

When the switch 210 is turned on by the user, the current control circuit 120 outputs a plurality of driving currents to the LED light source 230 respectively in different time intervals. If the user does not flash the switch 210 during a period of $0$-$t_2$, the brightness of the LED light source 230 increases from the first brightness L1 to the second brightness L2 in stages, so that the brightness is maintained at the second brightness L2. Otherwise, if the user flashes the switch 210 at a time $t_1$, the brightness of the LED light source 230 is instantly reduced to 0 during flashing, and then is maintained at the corresponding third brightness L3. No matter the brightness of the LED light source 230 is maintained at the second brightness L2 or at the third brightness L3, the user may turn off the switch 210 to turn off the LED light source 230. After the LED light source 230 is turned off for a while (e.g. after several seconds), the user may select the brightness of the LED light source 230 according to the above mode again.

In this embodiment, the current control circuit 220 may be built in the switch 210, or may be built in the LED light source 230. For example, the current control circuit 220 may be fabricated into an IC. Then, the IC having the current modulation function is bonded in the switch 210 or the LED light source 230.

Figure 3C:
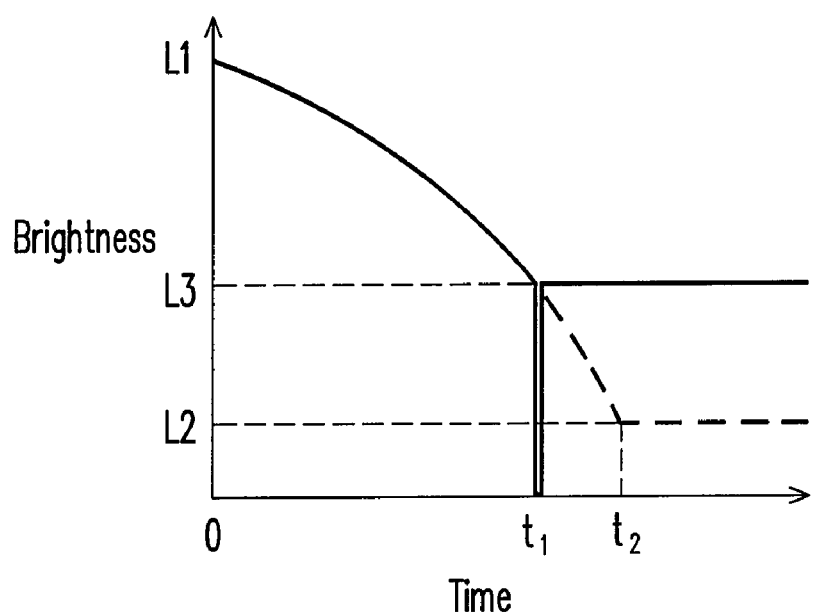
Figure 3D:
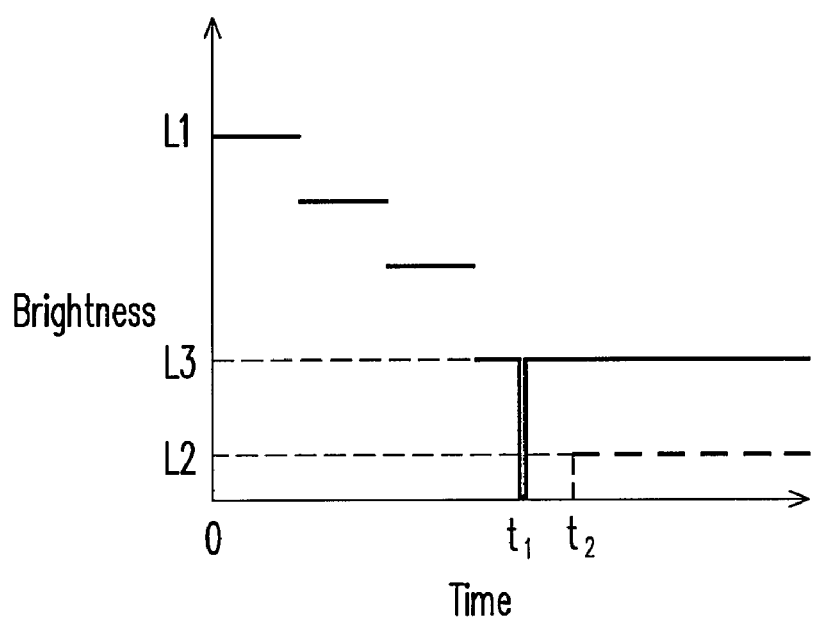

It should be noted that in an embodiment of the present invention, the first brightness L1 exemplified in FIGS. 3A and 3B is lower than the second brightness L2 exemplified in FIGS. 3A and 3B (i.e. the brightness gradually increases with the time). However, in this embodiment, the first brightness L1 is not limited to be lower than the second brightness L2. In this embodiment, the first brightness L1 may also be set to be greater than the second brightness L2, as shown in FIGS. 3C and 3D. In addition, in this embodiment, the brightness of the LED light source 230 gradually increases first and then gradually decreases with the time, or gradually decreases first and then gradually increases with the time, or changes in another more complex mode. The various brightness changing modes fall within the scope of the present invention.

In an embodiment of the present invention, the LED light source 230 of the illumination system 200 further includes a temperature sensor 240 electrically connected to the current control circuit 220. The current control circuit 220 modulates the driving current provided to the LED light source 230 according to the feedback signal provided by the temperature sensor 240. Therefore, when the temperature sensor 240 senses that the temperature is too high, the current control circuit 220 may reduce the driving current output to the LED light source 230, so as to lower the temperature to prolong the service life of the LED.

It should be noted that in the illumination system 200 of this embodiment, a fuse, an over-temperature protection circuit in the current control circuit 120, and the temperature sensor 240 may be used to provide triple protection to protection the LED light source 230, so a fault rate of the illumination system 200 of this embodiment may be effectively lowered.

The Third Embodiment

Referring to FIG. 2, the illumination system 200 of this embodiment includes a switch 210, an LED light source 230, and a current control circuit 220. The current control circuit 220 is electrically connected between the switch 210 and the LED light source 230. When the switch 210 is turned off, the current control circuit 220 outputs a driving current to delay the time point at which the LED light source 230 is completely turned off.

Figure 4A:
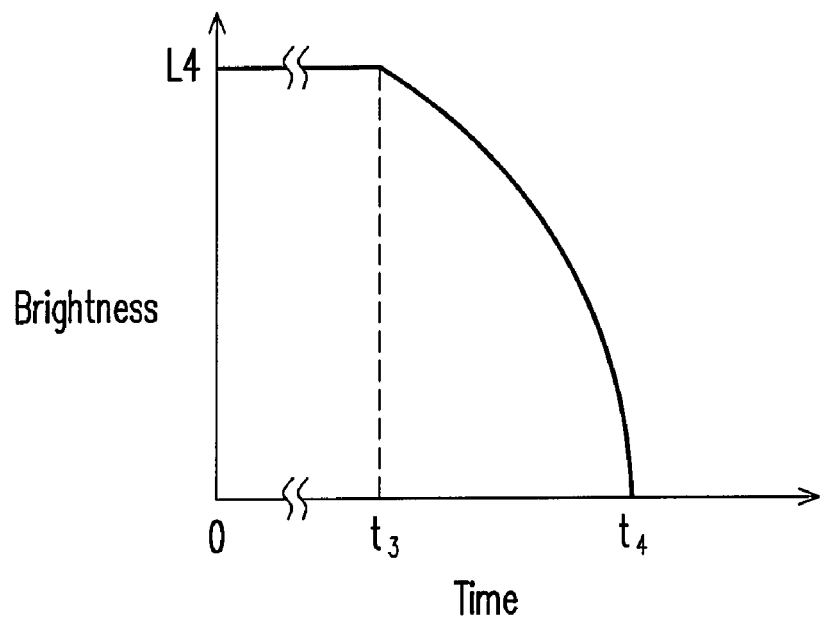
FIGS. 4A to 4B are diagrams showing the relationship between brightness and time of the illumination system according to a third embodiment of the present invention.
Figure 4B:
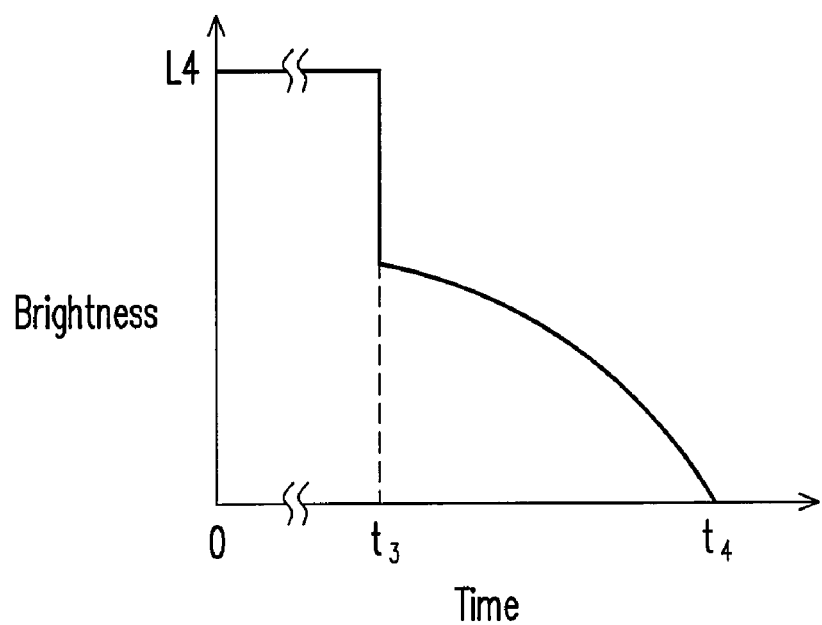

FIGS. 4A to 4B are diagrams showing a relationship between brightness and time of the illumination system according to a third embodiment of the present invention. Referring to FIG. 4A, when the switch 210 is turned off at a time $t_3$, the current control circuit 220 outputs a driving current to the LED light source 230, so that the brightness gradually approaches 0 (time $t_4$) from the original brightness. Referring to FIG. 4B, according to another design of brightness change of this embodiment, when the switch 210 is turned off at the time $t_3$, the current control circuit 220 may output a driving current to the LED light source 230, so that the brightness become dim immediately from the original brightness (e.g. the brightness becomes half of the original brightness immediately), and then gradually approaches 0 (time $t_4$). Since the brightness is reduced to a half immediately, so the design of brightness change of FIG. 4B is power saving as compared with that of FIG. 4A, and the time $t_4$ may be further delayed. Definitely, according to the concept of the present invention, after the power source is switched off, the process that the brightness of the lamp light changes to 0 with the time is not limited to the designs of FIGS. 4A and 4B.

This embodiment may be applied when the user forgets to take keys or other articles on the cabinet beside the door after turning off the lamp and leaving the room. The illumination system of this embodiment can delay the time (e.g. several seconds) when the lamp is completely turned off, so that the user may use the time to take the articles, etc without the need of turning on the lamp again. Further, if some people are in still the room when the lamp is suddenly turned off, the function that the time is delayed when the lamp light completely becomes dark of the illumination system of this embodiment may also enhance the safety for people working or walking in the room. The embodiment has numerous applications, and is not limited to the above situation.

In view of the above, an over drive manner may be adopted in each of the above embodiments to drive the illumination systems 100 and 200, so as to make the illumination systems 100 and 200 to provide the illumination (for example, 150% to 300%) greater than a rated brightness in the predetermined time (for example, within several hours). In other words, the illumination systems 100 and 200 can provide more diverse brightness changes.

The Fourth Embodiment

FIGS. 5A to 5D are diagrams showing a relationship between brightness and time of the illumination system according to a fourth embodiment of the present invention. Referring to FIG. 2 and FIG. 5A to FIG. 5D, after the LED light source 230 is turned on through the switch 210, the brightness of the LED light source 230 changes from the first brightness L1 to the second brightness L2. If users the flash switch 210 after the time $t_1$, the brightness of the LED light source 230 can be elevated to an over-drive brightness $L_{OD}$ greater than the second brightness L2. In the present embodiment, the over-drive brightness $L_{OD}$ is 1.5 times to 3 times of the second brightness L2, for example.

Figure 5A:
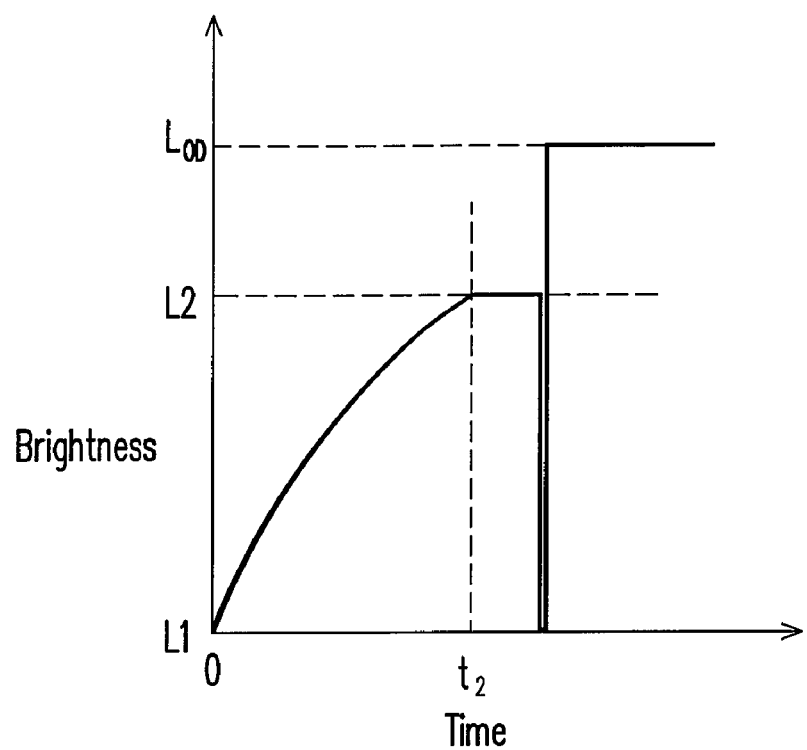
FIGS. 5A to 5D are diagrams showing the relationship between brightness and time of the illumination system according to a fourth embodiment of the present invention.

Referring to FIG. 2 and FIG. 5A, in the present embodiment, during the change of the brightness of the LED light source 230 from the first brightness L1 to the second brightness L2, the brightness of the LED light source 230 may change continuously, and the brightness of the LED light source 230 may change linearly or non-linearly (as shown in FIG. 5A). Specifically, when the switch 210 is turned on by the user, the current control circuit 120 outputs a driving current that increases with time to the LED light source 230. If the user does not flash the switch 210 during a period of 0-$t_2$, the brightness of the LED light source 230 increases from the first brightness L1 to the second brightness L2 continuously, so that the brightness is maintained at the second brightness L2. It is noted that, if the user flashes the switch 210 after the time $t_2$, the brightness of the LED light source 230 can be elevated to an over-drive brightness $L_{OD}$ immediately.

Figure 5B:
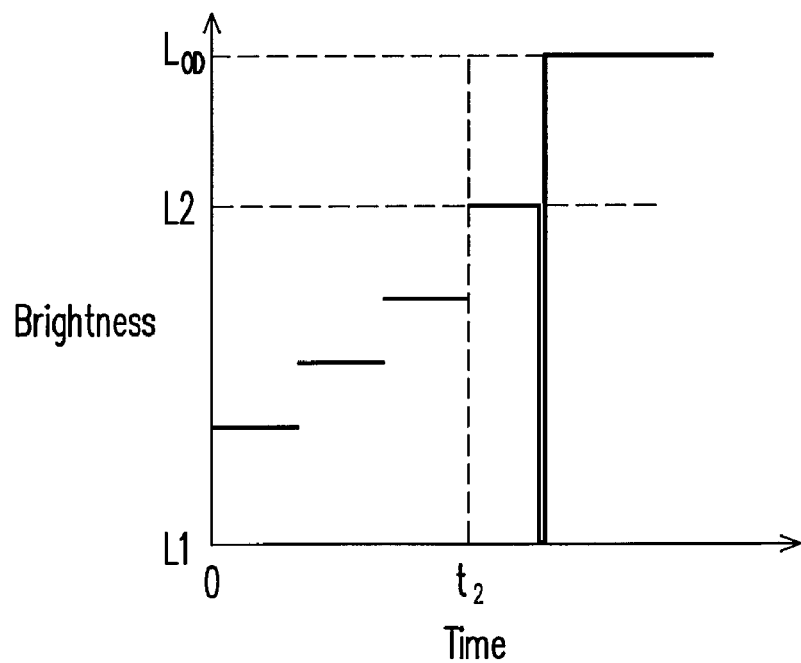
Figure 5C:
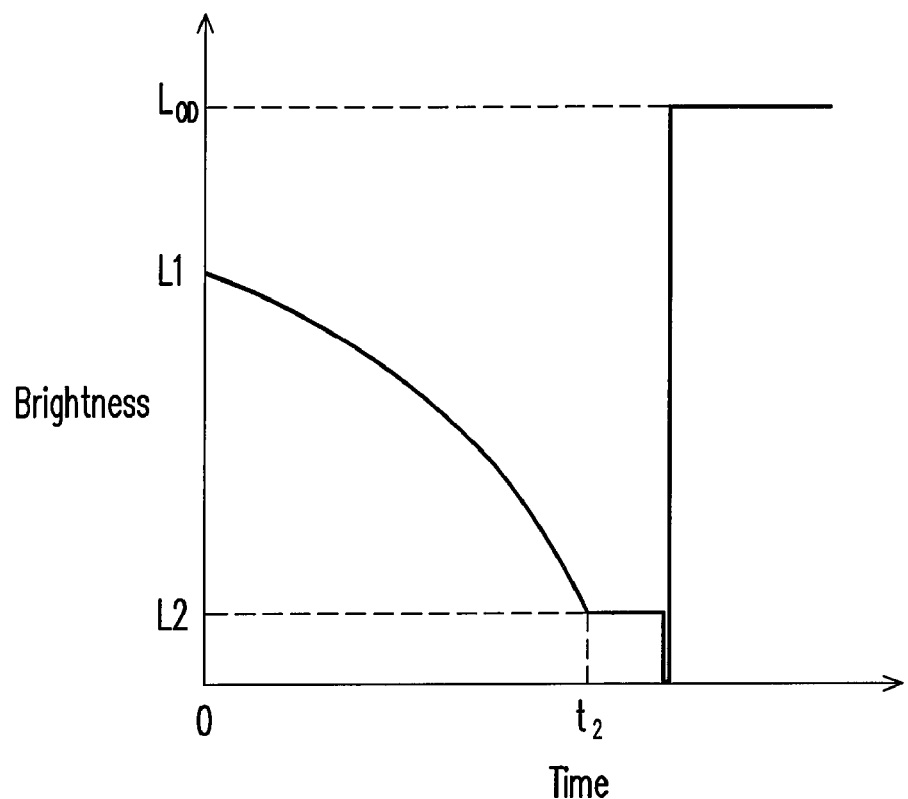
Figure 5D:
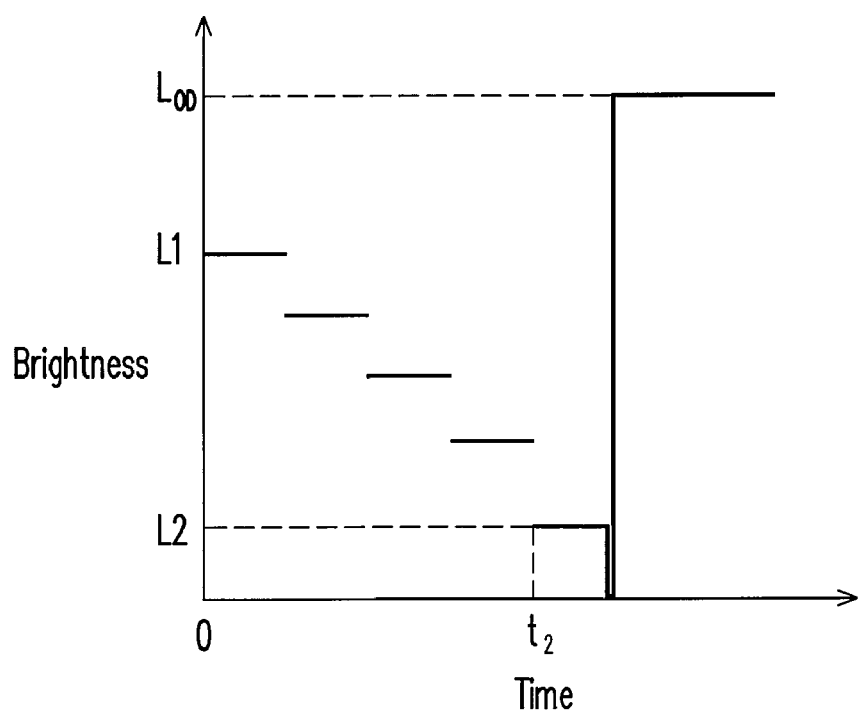

Referring to FIG. 2 and FIG. 5B, in the present embodiment, during the change of the brightness of the LED light source 230 from the first brightness L1 to a second brightness L2, the brightness of the LED light source 230 changes non-continuously. Specifically, when the switch 210 is turned on by the user, the current control circuit 120 outputs a plurality of driving currents to the LED light source 230 respectively in different time intervals. If the user does not flash the switch 210 during a period of 0-$t_2$, the brightness of the LED light source 230 increases from the first brightness L1 to the second brightness L2 in stages, so that the brightness is maintained at the second brightness L2. It is noted that, if the user flashes the switch 210 after the time $t_2$, the brightness of the LED light source 230 can be elevated to an over-drive brightness $L_{OD}$ immediately.

In an embodiment of the present invention, the first brightness L1 exemplified in FIGS. 3A and 3B is lower than the second brightness L2 exemplified in FIGS. 3A and 3B (i.e. the brightness gradually increases with the time). However, in this embodiment, the first brightness L1 is not limited to be lower than the second brightness L2. In this embodiment, the first brightness L1 may also be set to be greater than the second brightness L2, as shown in FIGS. 3C and 3D. In addition, in this embodiment, the brightness of the LED light source 230 gradually increases first and then gradually decreases with the time, or gradually decreases first and then gradually increases with the time, or changes in another more complex mode. The various brightness changing modes fall within the scope of the present invention.

To sum up, the brightness of the LED lamp and the illumination system can be controlled by the number of flashing times and the time point of flashing of the switch. After the power source is switched off, the time point at which the lamp is completely turned off may be delayed, such that the application of the LED lamp and the illumination system becomes wider. Additionally, in some embodiments of the present invention, the illumination system can be over-driven through the flashing of the switch such that the illumination system is capable of providing ultra-high brightness.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An illumination system, comprising:
   a switch;
   an LED light source; and
   a current control circuit electrically connected between the switch and the LED light source, wherein when the switch is turned ON, the current control circuit outputs a driving current to change a brightness of the LED light source from a first brightness to a second brightness, and wherein the switch is intermittently actuated-deactuated to stop the change of the brightness, thereby maintaining the brightness of the LED light source at a third brightness.

2. The illumination system as claimed in claim 1, wherein the switch comprises a tactile switch or a button switch.

3. The illumination system as claimed in claim 1, wherein the LED light source comprises an LED lamp.

4. The illumination system as claimed in claim 1, wherein the current control circuit is built in the switch.

5. The illumination system as claimed in claim 1, wherein the current control circuit is built in the LED light source.

6. The illumination system as claimed in claim 1, wherein the LED light source further comprises a temperature sensor electrically connected to the current control circuit, and the current control circuit modulates the driving current provided to an LED array according to a feedback signal provided by the temperature sensor.

7. The illumination system as claimed in claim 1, wherein when the brightness of the LED light source changes from the first brightness to the second brightness during a time period of 0 to t2, the switch is not intermittently actuated-deactuated during said time period.

8. The illumination system as claimed in claim 1, wherein when the brightness of the LED light source changes from the first brightness to the second brightness during a time period of 0 to t2, the switch is intermittently actuated-deactuated after the time period of 0 to t2, and the brightness of the LED light source is an over-drive brightness.

9. The illumination system as claimed in claim 8, wherein the first brightness is greater than the second brightness, and the over-drive brightness is greater than the first brightness.

10. The illumination system as claimed in claim 9, wherein the over-drive brightness is 1.5 times to 3 times of the first brightness.

11. The illumination system as claimed in claim 8, wherein the second brightness is greater than the first brightness, and the over-drive brightness is greater than the second brightness.

12. The illumination system as claimed in claim 11, wherein the over-drive brightness is 1.5 times to 3 times of the second brightness.

13. An illumination system comprising:
a switch;
an LED light source; and
a current control circuit electrically connected between the switch and the LED light source, wherein when the switch is turned ON, the current control circuit outputs a driving current to change a brightness of the LED light source from a first brightness to a second brightness, and wherein the switch is intermittently actuated —deactuated to stop the change of the brightness, thereby maintaining the brightness of the LED light source at a third brightness ranging between the first brightness and the second brightness.

14. The illumination system as claimed in claim 13, wherein the first brightness is greater than the second brightness.

15. The illumination system as claimed in claim 13, wherein the first brightness is lower than the second brightness.

16. The illumination system as claimed in claim 13, wherein during the change of the brightness of the LED light source from the first brightness to the second brightness, the brightness of the LED light source changes non-continuously.

17. The illumination system as claimed in claim 13, wherein during the change of the brightness of the LED light source from the first brightness to the second brightness, the brightness of the LED light source changes continuously.

18. The illumination system as claimed in claim 17, wherein during the change of the brightness of the LED light source from the first brightness to the second brightness, the brightness of the LED light source changes linearly or non-linearly.

* * * * *